United States Patent [19]

Mennicke et al.

[11] 4,424,152

[45] Jan. 3, 1984

[54] METAL COMPLEX DYESTUFFS, PROCESSES FOR THEIR PREPARATION AND THEIR USE FOR DYEING NITROGEN-CONTAINING MATERIALS

[75] Inventors: Winfried Mennicke; Hermann Goebel, both of Leverkusen, Fed. Rep. of Germany

[73] Assignee: Bayer Aktiengesellschaft, Leverkusen, Fed. Rep. of Germany

[21] Appl. No.: 281,615

[22] Filed: Jul. 9, 1981

[30] Foreign Application Priority Data

Aug. 1, 1980 [DE] Fed. Rep. of Germany ....... 3029271

[51] Int. Cl.³ .................... C09B 45/28; C09B 45/32
[52] U.S. Cl. .................................... 260/148; 260/184
[58] Field of Search ........................................ 260/148

[56] References Cited

U.S. PATENT DOCUMENTS

| 2,042,810 | 6/1936 | Straub et al. | 260/148 |
| 2,111,559 | 3/1938 | Fellmer | 260/148 X |
| 3,887,329 | 6/1975 | Hegar et al. | 260/148 X |
| 3,915,952 | 10/1975 | Sailer et al. | 260/148 X |
| 4,047,944 | 9/1977 | Rossi et al. | 260/148 X |
| 4,152,324 | 5/1979 | McCrae et al. | 260/148 X |
| 4,263,229 | 4/1981 | Studer et al. | 260/148 X |

FOREIGN PATENT DOCUMENTS

| 707225 | 6/1941 | Fed. Rep. of Germany | 260/148 |
| 855142 | 7/1949 | Fed. Rep. of Germany | 260/148 |
| 424262 | 2/1935 | United Kingdom | 260/148 |

Primary Examiner—Paul F. Shaver
Attorney, Agent, or Firm—Sprung, Horn, Kramer & Woods

[57] ABSTRACT

Metal complexes of disazo dyestuffs of the formula

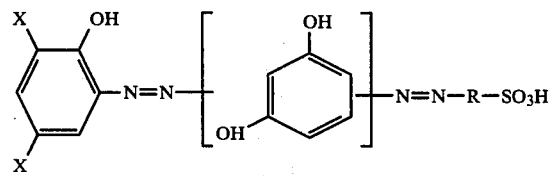

wherein
one X=chlorine and the other X=NO₂, or
both the radicals X=chlorine, and
R=the radical of a diazo component of the benzene, naphthalene or diphenylamine series which, in the o-position relative to the azo group, is free from groups which form metal complexes, and their use for dyeing and printing of nitrogen containing materials, such as silk, wool or synthetic fibers of polyamides or polyurethanes. The resulting dyeings have excellent fastness properties.

3 Claims, No Drawings

METAL COMPLEX DYESTUFFS, PROCESSES FOR THEIR PREPARATION AND THEIR USE FOR DYEING NITROGEN-CONTAINING MATERIALS

The present invention relates to metal complexes, in particular the copper, iron and nickel complexes, of disazo dyestuffs of the formula

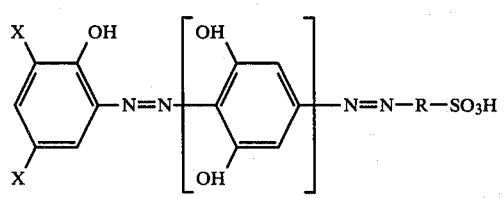

wherein
one X denotes chlorine and the other X denotes nitro, or
the two radicals X denote chlorine, and
R denotes the radical of a diazo component of the benzene, naphthalene or diphenylamine series which, in the o-position relative to the azo group, is free from groups which form metal complexes, and mixtures thereof.

The diazo components $H_2N-R-SO_3H$ can contain further customary substituents, for example $NO_2$, Cl, $C_1-C_4$-alkyl, $C_1-C_4$-alkoxy or $SO_3H$, or a COOH group which is not in the o-position relative to the azo group.

Preferred diazo components $H_2N-R-SO_3H$ are those of the formula (II), (III) or (IV).

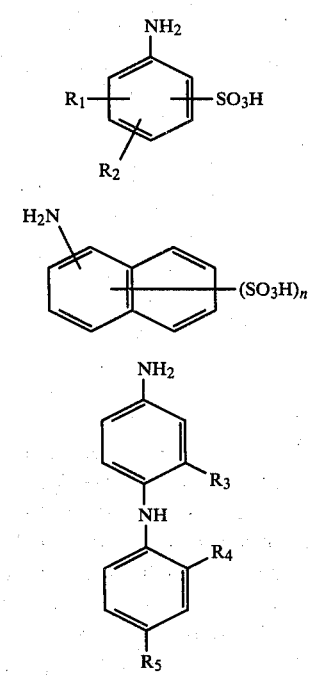

wherein
$R_1$ and $R_2$ denote hydrogen, Cl, $CH_3$, $OCH_3$, $SO_3H$ or $NO_2$, or COOH which is not in the o-position relative to the azo group,
n denotes 1 or 2,
$R_3$ denotes hydrogen or $SO_3H$ and $R_4$ and $R_5$ denote hydrogen, or
one of the two radicals $R_4$ and $R_5$ denotes hydrogen and
the other radical $R_4$ or $R_5$ denotes Cl or $OCH_3$, or
one of the two radicals $R_4$ and $R_5$ denotes $NO_2$ and the other radical $R_4$ or $R_5$ denotes $SO_3H$.

The metal complex dyestuffs according to the invention can be prepared by a process in which, in any desired sequence, resorcinol is coupled with a diazotised amine of the formula (V)

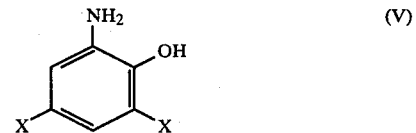

and with a diazotised amine of the formula $H_2N-R-SO_3H$, for example an amine of the formula (II), (III) or (IV), and the resulting disazo dyestuffs of the formula (I) are reacted with a suitable metal compound or a mixture of suitable metal compounds.

As a result of the different sequences of the coupling reactions and the two possible coupling positions, the disazo dyestuffs of the formula (I) can be the compounds (VI), (VII) or (VIII) or mixtures of these compounds.

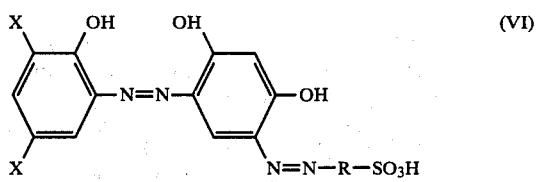

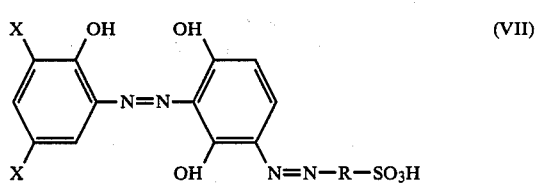

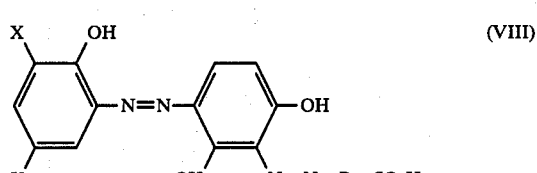

Preferably, resorcinol is first coupled with the amines (V), which have a lower coupling energy. In this case, the metallisation can precede the coupling reaction with the amines (II), (III) or (IV). A first coupling reaction with the amines (V) and metallisation, or a second coupling reaction with these amines and metallisation can also be carried out in one step. For example, it is possible initially to introduce resorcinol and a suitable metal compound, according to U.S. Pat. No. 2,042,810, into the reaction mixture and to subject the mixture to a coupling reaction first with the amines (V) and then with the amines (II), (III) or (IV).

The coupling can be carried out by methods which are in themselves known, in a basic aqueous medium at pH values from 7.5 to 14, preferably at pH 9–10, and at temperatures of 0° to about 30° C., preferably at 5°–10° C.

The metallisation is carried out in a manner which is in itself known, in an aqueous or aqueous-organic medium at temperatures of 20°–100° C., under normal pressure and at a pH value of 3–12, preferably 4–10. It is preferably carried out in the presence of acid acceptors, for example carbonates, bicarbonates, oxides and hydroxides of alkali metals and alkaline earth metals, such as $Li_2CO_3$, $Na_2CO_3$, $K_2CO_3$, $LiHCO_3$, $NaHCO_3$, $KHCO_3$, LiOH, NaOH, KOH, MgO or CaO, or of alkaline salts of alkali metals, such as sodium acetate or potassium acetate, or of ammonia or lower alkyl-substituted amines. Solvents which can be added are lower alcohols, such as ethanol, carboxamides, such as formamide or dimethylformamide, ethylene glycol or mono-$C_1$–$C_4$-alkyl ethers thereof. Suitable metal compounds are chiefly the copper, iron and nickel salts of inorganic or organic acids.

Suitable copper salts are copper carbonate, copper chloride, copper sulphate, copper acetate and copper formate. The coppering is in general carried out at 80°–100° C. under weakly acid conditions or at 20°–100° C. under weakly alkaline conditions, preferably in the presence of an amount of ammonia such that the copper salt is dissolved as the tetramine complex.

Iron compounds which can be used are, for example, iron-II chloride, sulphate or nitrate or iron-III chloride, sulphate or nitrate. It is expedient to use nickel chloride, nickel sulphate, nickel acetate or nickel formate to introduce nickel.

The use of agents which donate different metals leads to mixed metal complex compounds. These can be prepared in one stage or successively, under the optimum pH and temperature conditions for the metals.

The preferred nickel complexes and copper complexes are the 1:1 complexes and the preferred iron complexes are the 1:2 complexes.

The 1:2 iron complexes have the general formula (IX).

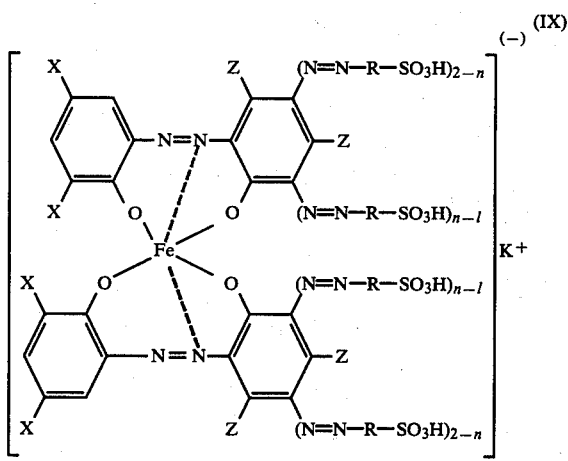

wherein
X and R have the same meaning as in formula (I),
one Z denotes hydrogen and the other Z denotes hydroxyl,
n denotes 1 or 2 and
$K^+$ represents a cation, in particular an alkali metal cation, alkaline earth metal cation or ammonium cation, or a protonated alkylamine, in particular a protonated $C_1$–$C_4$-alkylamine.

The nickel complexes and copper complexes correspond to the general formula (X)

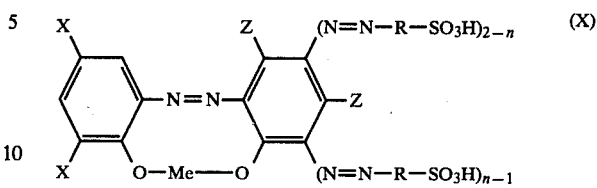

wherein where Me denotes copper or nickel.

The new metal complex dyestuffs can be isolated by spray-drying or by precipitation with electrolytes, such as sodium chloride or potassium chloride. They are valuable water-soluble dyestuffs which are particularly suitable for dyeing and printing nitrogen-containing materials, such as silk, wool and synthetic fibres of polyamides or polyurethanes.

They are preferably suitable for dyeing leather which has been tanned in various ways. They can be used for dyeing from a weakly alkaline bath, for example an ammoniacal bath, a neutral bath or a weakly acid bath, for example a bath containing acetic acid, and they produce dyeings in bright brown shades with excellent fastness properties.

When the metal complex dyestuffs according to the invention are treated with amines, such as cyclohexylamine, dicyclohexylamine or arylguanidines, they give salts which dissolve in organic solvents. Solutions of these salts, for example in alcohols, diols or ketones, are suitable for spray-dyeing leather.

The formulae given are those of the free acids. The salts, in particular the alkali metal salts, such as the sodium salts, are generally employed.

EXAMPLE 1

14 ml of 30% strength hydrochloric acid are added to 18.85 g of 4-nitro-6-chloro-2-aminophenol in a mixture of 100 ml of water and 100 g of ice, and the amine is diazotised with 23 ml of 4.35 N sodium nitrite solution in the course of 20 minutes. The suspension of the diazonium salt is stirred for a further half hour and any excess nitrous acid is then destroyed with a little amidosulphonic acid. A solution of 11 g of resorcinol and 28 g of calcined sodium carbonate in 200 ml of ice-water is combined with the diazonium compound at 0° C. The coupling goes to completion immediately. 17.3 g of p-sulphanilic acid are dissolved in 100 ml of water and 10 ml of 10 N sodium hydroxide solution and precipitated with 28 ml of 30% strength hydrochloric acid. 120 g of ice are added, diazotisation is carried out with 23 ml of 4.35 N sodium nitrite solution in the course of 15 minutes, excess nitrous acid is destroyed half an hour later and the suspension of the diazonium compound is allowed to run into the suspension of the monoazo dyestuff. After stirring the mixture at pH 8.5 for about one hour, the second coupling reaction has ended.

The resulting suspension of the disazo dyestuff of the formula

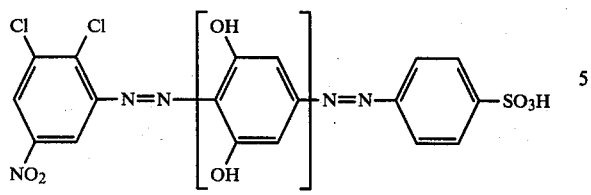

is warmed to 70° C., after adding 20 g of anhydrous sodium acetate, and is treated with 25 g of CuSO$_4$.5H$_2$O at this temperature for 1 hour. The copper complex formed is salted out by adding 20% by weight of sodium chloride, filtered off and dried. It is a brown powder which dyes leather in reddish-tinged brown shades with a good fastness to light and good fastness properties in use.

EXAMPLE 2

The disazo dyestuff of Example 1 which has been obtained under the same conditions is metallised with 27 g of FeCl$_3$.6H$_2$O at 80° for one hour in the presence of 20 g of anhydrous sodium acetate. After salting out, filtering off and drying the product, a dark brown powder is obtained, which gives, on leather, high-yield, olive-brown dyeings with good fastness properties.

EXAMPLE 3

The same amount of the disazo dyestuff described under Example 1 is treated, in the presence of 20 g of anhydrous sodium acetate at 80° C., first with 5 g of CuSO$_4$.5H$_2$O for 15 minutes and then with 22 g of FeCl$_3$.6H$_2$O for 30 minutes. A less greenish-tinged, clear brown dyestuff with a good build-up capacity on leather results.

If the metallisation sequence is changed or the disazo dyestuff of Example 1 is metallised with a mixture of 5 g of CuSO$_4$.5H$_2$O and 22 g of FeCl$_3$6H$_2$O, mixed metal complex dyestuffs with similar properties on leather are obtained.

EXAMPLE 4

If the 20 g of anhydrous sodium acetate and the 25 g of CuSO$_4$.5H$_2$O in Example 1 are replaced by 24.9 g of Ni(CH$_3$COO)$_2$.4H$_2$O and the metallisation is carried out at 70° C. and at pH 6.5 for 2 hours, the corresponding nickel complex, which dyes leather in a yellower, clearer shade, is obtained.

EXAMPLE 5

If the 17,3 g of p-sulphanilic acid in Example 1 are replaced by the corresponding amount of the amines of the formula (II) listed below, disazo dyestuffs of the general formula (XI) are obtained:

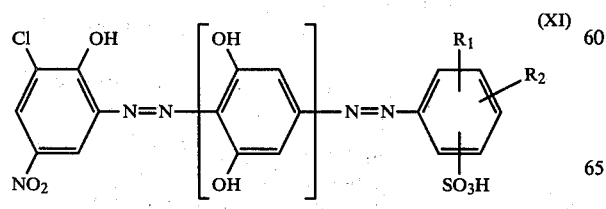

Amines of the formula (II):

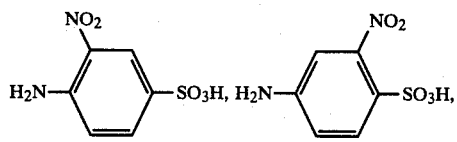

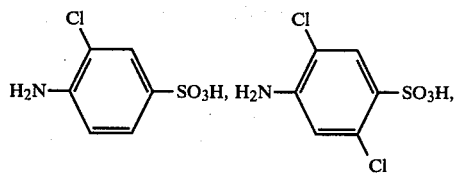

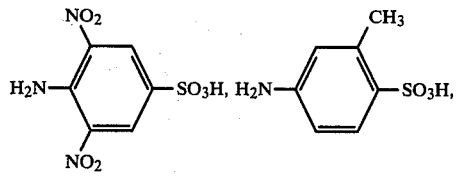

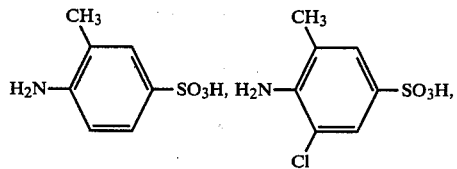

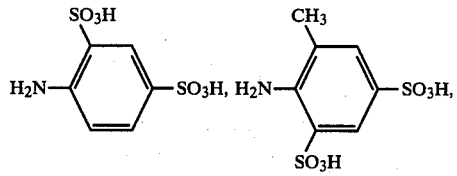

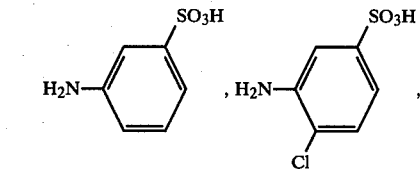

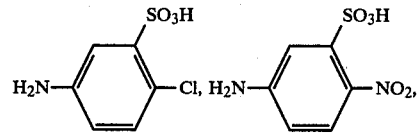

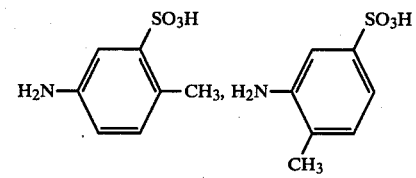

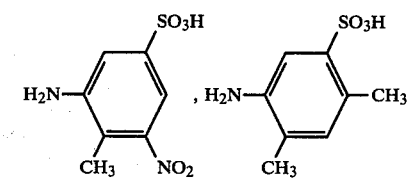

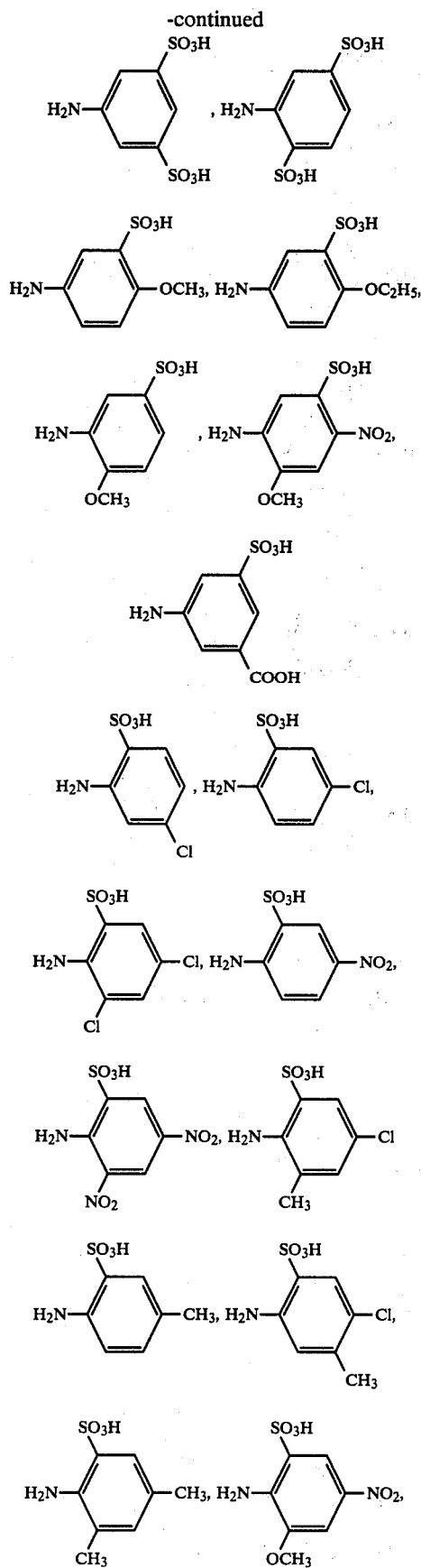

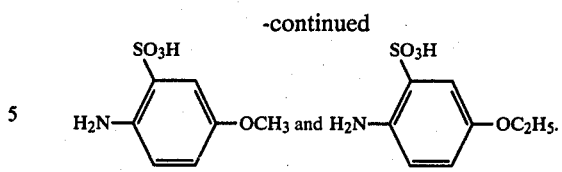

When the disazo dyestuffs (XI) are metallised with agents which donate copper, they give red-brown copper complexes with similar properties on leather to the dyestuff of Example 1. The properties of the iron complexes correspond to those of the dyestuff of Example 2, the properties of the copper/iron mixed complexes correspond to those of the dyestuff of Example 3, and the properties of the nickel complexes correspond to those of the dyestuff of Example 4.

EXAMPLE 6

22.3 g of 1-amino-6-naphthalenesulphonic acid are dissolved in 200 ml of water by adding 10 ml of 10 N sodium hydroxide solution dropwise and are reprecipitated by dropwise addition of 28 ml of 30% strength hydrochloric acid. After adding 200 g of ice, 23 ml of 4.35 N sodium nitrite solution are added dropwise in the course of 15 minutes. Half an hour later, excess nitrous acid is removed with amidosulphonic acid and the suspension of the diazonium salt formed is combined with the monoazo dyestuff obtained from 18.85 g of diazotised 4-nitro-6-chloro-2-aminophenol and 11 g of resorcinol. The coupling, in a solution rendered alkaline with sodium carbonate, to give the disazo dyestuff of the formula

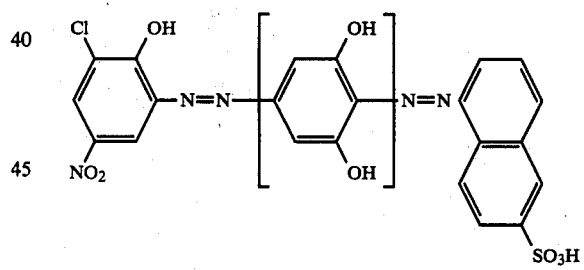

has ended after about two hours.

When used for dyeing leather, the copper complex obtained by reaction of the disazo dyestuff with copper acetate is redder than the copper complex described under Example 1; the iron complex is yellower and less green than the iron complex of Example 2. The copper-/iron mixed complexes are dark brown dyestuffs for leather which have a high tinctorial strength and are fast to light.

Similar red-brown and dark brown dyestuffs for leather are obtained if, instead of the 22.3 g of 1-amino-6-naphthalenesulphonic acid, equivalent amounts of the naphthylaminesulphonic acids listed below are used, and the disazo dyestuffs formed, of the formula

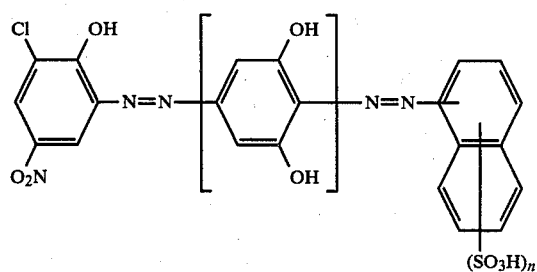

wherein n denotes 1 or 2, are treated with agents which donate copper, nickel or iron:

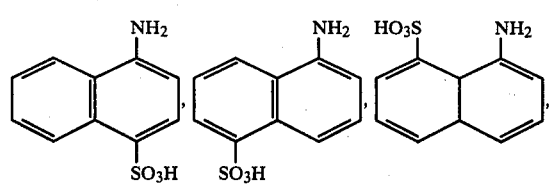

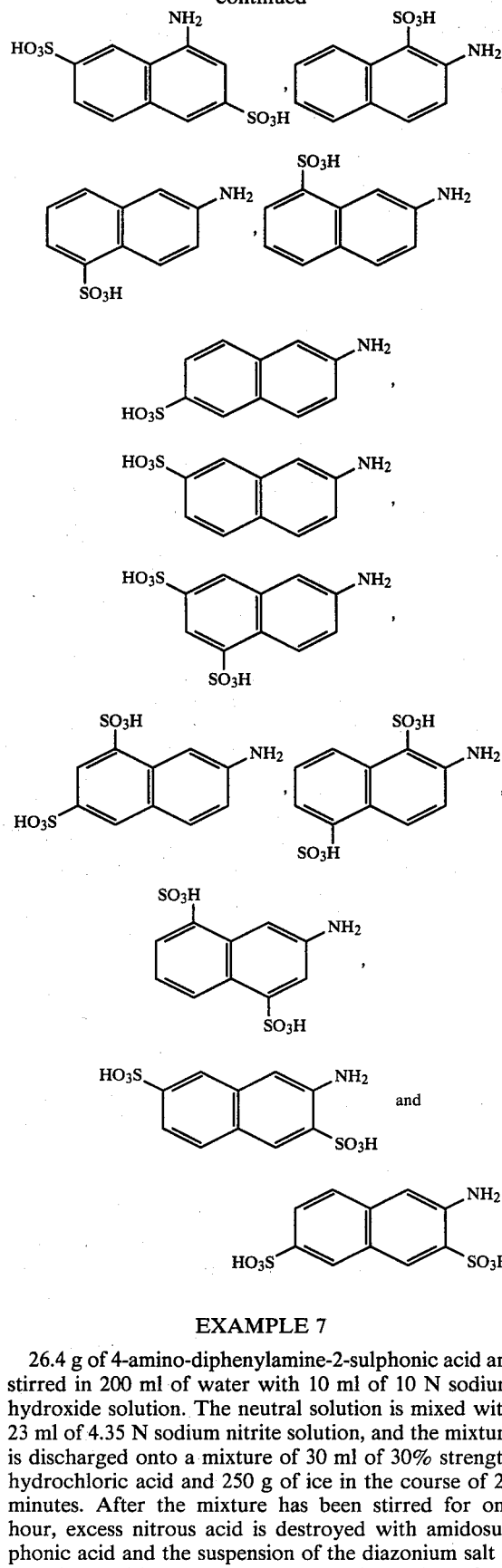

EXAMPLE 7

26.4 g of 4-amino-diphenylamine-2-sulphonic acid are stirred in 200 ml of water with 10 ml of 10 N sodium hydroxide solution. The neutral solution is mixed with 23 ml of 4.35 N sodium nitrite solution, and the mixture is discharged onto a mixture of 30 ml of 30% strength hydrochloric acid and 250 g of ice in the course of 20 minutes. After the mixture has been stirred for one hour, excess nitrous acid is destroyed with amidosulphonic acid and the suspension of the diazonium salt is combined with the monoazo dyestuff obtained from 18.85 g of diazotised 4-nitro-6-chloro-2-aminophenol and 11 g of resorcinol. After about 2 hours at a weakly alkaline pH, the coupling reaction has ended.

The copper complex of the resulting disazo dyestuff of the formula

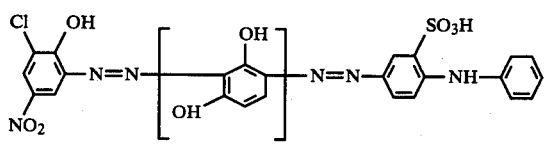

is a reddish-tinged brown dyestuff which can be used for leather and has a comparable colour shade to the copper complex of Example 6. The iron complex is a neutral brown, and less yellow than the iron complex of Example 6. The iron/copper complexes give deep brown dyeings on leather.

Metal complex dyestuffs with which similar dyeings can be achieved on leather can be prepared by replacing the 26.4 g of 4-amino-diphenyl-2-sulphonic acid by 29.85 g of 4-amino-4'-chloro-diphenylamine-2-sulphonic acid, 29.4 g of 4-amino-4'-methoxy-diphenylamine-2-sulphonic acid, 30.9 g of 4-amino-4'-nitro-diphenylamine-2'-sulphonic acid or 30.9 g of 4-amino-2'-nitro-diphenylamine-4'-sulphonic acid.

EXAMPLE 8

18.85 g of 4-chloro-6-nitro-2-aminophenol are stirred in 150 ml of water and 14 ml of 30% strength hydrochloric acid and, after adding 150 g of ice, are diazotised with 23 ml of 4.35 N sodium nitrite solution in the course of 15 minutes. 30 minutes later, excess nitrous acid is removed with amidosulphonic acid and the suspension of the diazonium compound is added to a solution of 11 g of resorcinol and 28 g of calcined sodium carbonate. The coupling reaction goes to completion immediately. The monoazo dyestuff is then coupled with 22.3 g of diazotised 1-amino-6-naphthalenesulphonic acid, as described in Example 6. The resulting disazo dyestuff of the formula

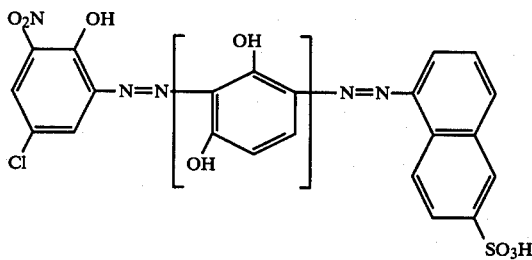

reacts with copper-donating agents to give a clear, reddish-tinged brown copper complex which gives fast dyeings on leather. The iron complex dyes leather in deep brown shades, which are less yellow than those obtained with the iron complex described under Example 6.

If the 1-aminonaphthalene-6-sulphonic acid is replaced by other amines mentioned in the preceeding examples, such as p-sulphanilic acid or 4-amino-4'-nitrodiphenylamine-2'-sulphonic acid, dyestuffs which dye leather and have similar properties are obtained.

EXAMPLE 9

21.45 g of the HCl salt of 4,6-dichloro-2-aminophenol are dissolved in 600 ml of water at 90° C. and, after treatment with active charcoal, the solution is clarified. The solution is allowed to cool to room temperature, 7 ml of 30% hydrochloric acid are added and, after adding about 100 g of ice, the amine is diazotised with 23 ml of 4.35 N sodium nitrite solution at 10° C. in the course of 15 minutes. The diazotisation mixture is subsequently stirred for half an hour, amidosulphonic acid is added in order to remove excess nitrous acid, and the diazotisation product is subjected to coupling with a solution of 11 g of resorcinol and 42 g of calcined sodium carbonate in 100 ml of water and 50 g of ice. Immediately thereafter, the mixture is reacted with 22.3 g of diazotised 1-aminonaphthalene-6-sulphonic acid to give the disazo dyestuff of the formula

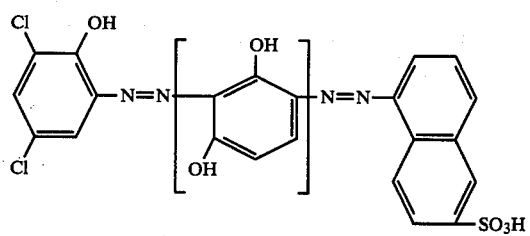

The copper complex prepared therefrom dyes leather in slightly redder brown shades than the copper complex of Example 8. The shade of the iron complex is the same as that of the iron complex dyestuff of Example 8.

If the 1-aminonaphthalene-6-sulphonic acid in this example is replaced by one of the other amines mentioned in the above examples, for example by p-sulphanilic acid, 4-nitroaniline-2-sulphonic acid or 4-aminodiphenylamine-2-sulphonic acid, reddish-tinged brown to deep, dark brown dyestuffs which dye leather and have similar properties are obtained.

We claim:

1. Metal complexes of disazo dyestuffs of the formula

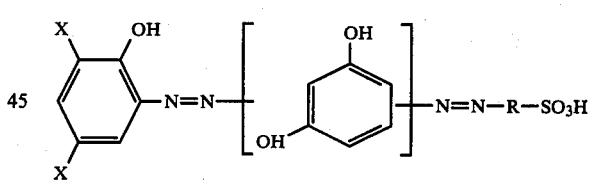

wherein
one X=chlorine and
the other X=NO₂, or
both the radicals X=chlorine, and
R=the radical of a diazo component of the benzene, naphthalene or diphenylamine series which, in the o-position relative to the azo group, is free from groups which from metal complexes.

2. Metal complexes of claim 1, wherein

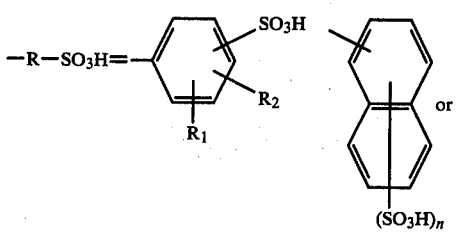

-continued

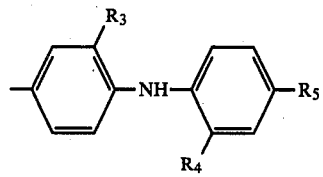

wherein $R_1$ and $R_2$=H, Cl, $CH_3$, $OCH_3$, $SO_3H$ or $NO_2$, or COOH which is not in the o-position relative to the azo group,
n=1 or 2,
$R_3$=H or $SO_3H$ and
$R_4$ and $R_5$=H, or
one of the radicals $R_4$ and $R_5$=H and the other radical $R_4$ or $R_5$=Cl or $OCH_3$, or
one of the radicals $R_4$ and $R_5$=$NO_2$ and the other radical $R_4$ or $R_5$=$SO_3H$.

3. The 1:1 nickel or copper complexes and the 1:2 iron complexes of the dyestuffs of claims 1 or 2.

* * * * *